United States Patent

[11] 3,581,473

| [72] | Inventors | Otis E. Ririe, Jr.<br>Bartlesville, Okla.;<br>John M. Magee, Bay City; Herbert A. Ems, Sweeny, both of, Tex. |
|---|---|---|
| [21] | Appl. No | 818,708 |
| [22] | Filed | Apr. 23, 1969 |
| [45] | Patented | June 1, 1971 |
| [73] | Assignee | Phillips Petroleum Company |

[54] SAMPLING APPARATUS
3 Claims, 1 Drawing Fig.

[52] U.S. Cl........................................................ 55/219,
55/222, 55/227, 55/233, 55/256, 55/259, 55/269,
55/270, 55/316, 55/387, 55/466, 73/23, 73/421.5,
261/21, 261/94, 261/121, 261/152
[51] Int. Cl.......................................................... B01d 47/00
[50] Field of Search............................................ 55/49, 68,
89, 222, 93, 227, 219, 233, 316, 259, 269,
387—88, 270, 386, 466, 48—51, 46, 80, 39, 256;
73/421.5, 23; 261/22, 94, 121, 152, 21

[56] References Cited
UNITED STATES PATENTS

| 852,543 | 5/1907 | Deckebach | 55/222X |
|---|---|---|---|
| 2,413,503 | 12/1946 | Katz | 55/93X |
| 2,754,930 | 7/1956 | Irvine | 55/49 |
| 2,787,335 | 4/1957 | Irvine | 55/49 |
| 2,861,431 | 11/1958 | Van Deemter | 62/5 |
| 3,076,301 | 2/1963 | Roof | 55/227X |
| 3,165,149 | 1/1965 | Raible et al. | 62/5X |
| 3,219,051 | 11/1965 | Francis | 55/49X |
| 3,490,202 | 1/1970 | Ayers | 55/67 |

Primary Examiner—Dennis E. Talbert, Jr.
Assistant Examiner—Bernard Nozick
Attorney—Young and Quigg ABSTRACT: An apparatus for preparing a gaseous sample stream for analysis by means passing said sample through a first scrubbing column, a second scrubbing column containing scrubbing liquid flowing in an opposed direction relative to the flow direction of the sample, a heat exchanger, and a drying column.

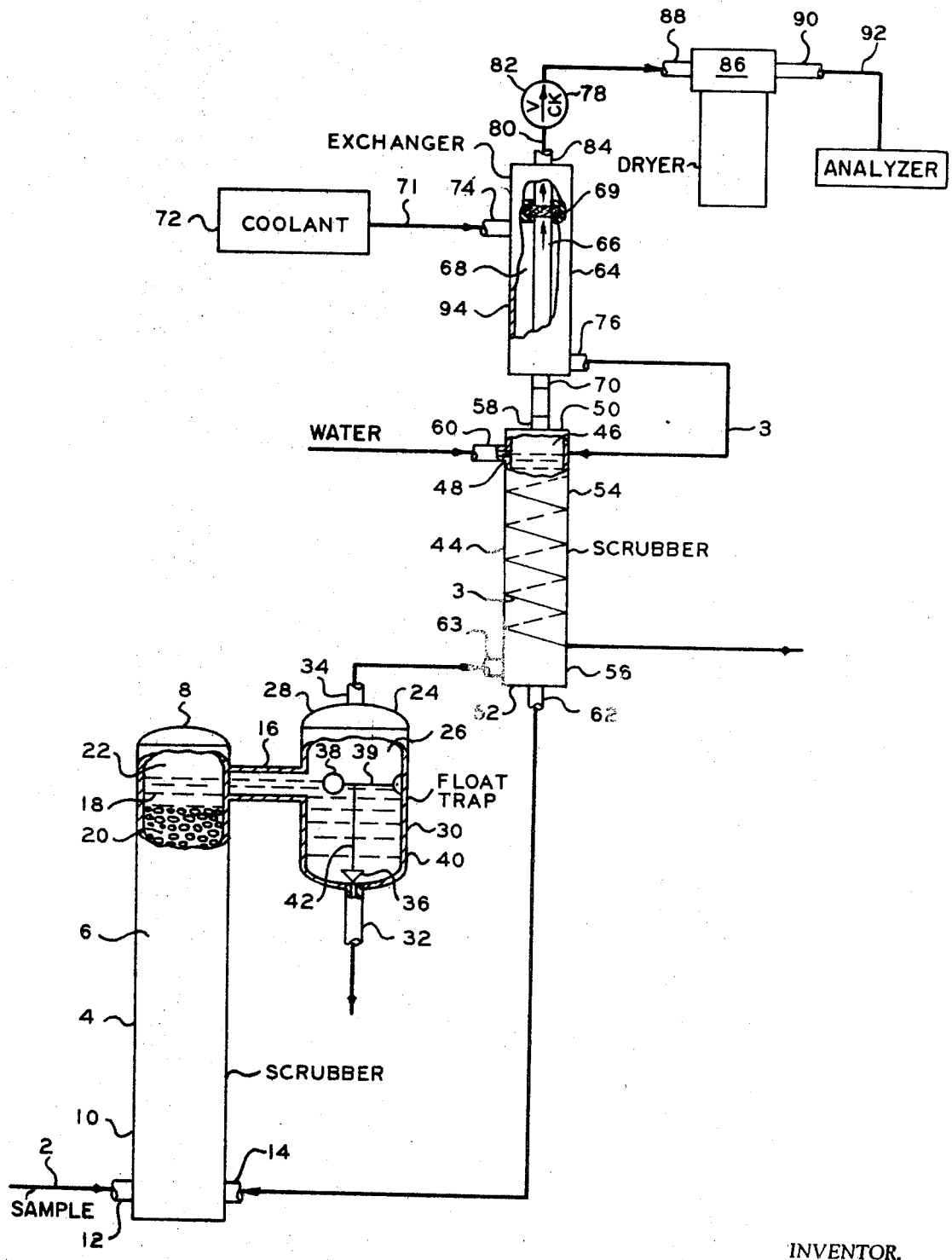

SAMPLING APPARATUS

This invention relates to a sampling apparatus for preparing a gaseous sample stream for analysis by removing from said stream undesirable components such as heavy oil, tars, carbon particles, dust, and water, so as to obtain a clean, dry, continuous and representative sample for said analysis.

Oil, water, tar, dust, or carbon found in the gaseous samples must be removed prior to analysis in order to obtain accurate analytical values. It is also desirable to remove these particles from the sample stream in order to protect analytical equipment from possible damage.

Accordingly, an object of this invention is to provide an improved sampling apparatus. Another object is to provide an improved apparatus for preparing a gaseous sample stream, such as a mixture of $C_4$ and lighter hydrocarbons, for analysis. Another object is to provide an improved apparatus for removing from a gaseous sample stream undesirable components such as carbon particles, dust, heavy oils, tars, and water, so as to obtain a clean, dry, continuous and representative sample for analysis.

Further objects and advantages of this invention will become apparent to those skilled in the art from the following discussion, appended claims and accompanying drawings, in which the single FIGURE illustrates a preferred embodiment of the sampling apparatus of this invention.

Referring to the drawing, a sample gas stream for analysis, such as a mixture of $C_4$ and lighter hydrocarbons, is continuously passed via line 2 to a first scrubbing column 4. The first scrubbing column 4 is preferably vertically positioned and has a chamber 6 extending longitudinally therethrough with upper and lower portions 8, 10. A sample inlet port 12 and a fluid inlet port 14 are formed on the lower portion 10 of the first scrubbing column 4. An outlet port 16 is formed on the upper portion 8 of said column 4. A body of scrubbing liquid 18 is maintained within the chamber 6 and a plurality of gas-liquid contact means 20, such as glass beads, ceramic marbles, and the like, are immersed within the scrubbing liquid. A gas accumulating zone 22 is maintained in the upper portion 8 of the chamber 6 above the scrubbing liquid 18.

Line 2 is connected to the sample inlet port 12 of the first scrubbing column 4 for the introduction of the sample stream into the lower portion 10 of the chamber 6. A float trap 24 which has a chamber 26 with upper and lower portions 28, 30 is connected to the outlet port 16 of the first column 4 with the chamber 26 of the float trap 24 in communication with the chamber 6 of the first scrubbing column 4. A liquid discharge port 32 is formed on the lower portion 30 and a sample discharge port 34 is formed on the upper portion 28 of the float trap 24. A valve 36 is positioned within the liquid discharge port 32 of the float trap 24. A liquid float 38 having a float rod 39 is preferably pivotally mounted on a sidewall 40 of the float trap 24 for movement in response to the height of the scrubbing liquid 18 relative to the float trap between first and second positions. A valve rod 42 is connected at one end to the float rod 39 and at the other end to the valve 36 for operation of the valve in response to movement of the float 38.

A second scrubbing column 44 is preferably vertically positioned and has a chamber 46 extending longitudinally therethrough. The second scrubbing column 44 has sidewalls 48, upper and lower ends 50, 52, and upper and lower end portions 54, 56. A sample outlet port 58 is formed on the upper end 50, a water inlet port 60 on the sidewalls 48 of the upper end portion 54, a fluid drain port 62 on the lower end 52, and a sample inlet port 63 on the lower end portion 56 of the second scrubbing column 44. The sample inlet port 63 of the second scrubbing column 44 is attached to and in communication with the sample discharge port 34 of the float trap 24 and the fluid drain port 62 of the second scrubbing column 44 is attached to and in communication with the fluid inlet port 14 of the first scrubbing column 4.

A water supply source or other liquid scrubbing material (not shown) is attached to the water inlet port 60 of the second scrubbing column 44 for circulating water into and downwardly through the second scrubbing column.

A heat exchanger 64 has individual sample and coolant fluid paths 66, 68, each path having inlet and outlet ends, for the separate flow of coolant and fluid sample therethrough. A gas filter 69 is installed within the sample fluid path 66 of the heat exchanger 64. The inlet end 70 of the heat exchanger's 64 sample fluid path 66 is connected to and in communication with the sample outlet port 58 of the second scrubbing column 44. A coolant feed line 71 of a cooling means 72, such as a conventional vortex cooling system, is attached to and in communication with the inlet end 74 of the heat exchanger's 64 coolant fluid path 68. The coolant fluid path 68 preferably extends beyond the heat exchanger and into contact with the second scrubbing column 44 for precooling the sample stream. A conventional control means (not shown) is attached to the cooling means 72 for controlling the rate of coolant passing from the cooling means to and through the coolant fluid path 66.

A liquid check valve 78 having inlet and outlet ends 80, 82 is attached at the inlet end 80 to and in communication with the outlet end 84 of the sample fluid path 66.

A drying column 86 having inlet and outlet ports 88, 90 and containing a desiccant, such as silica gel, activated alumina, and the like, is preferably positioned between the inlet and outlet ports of the drying column and attached to and in communication with the outlet end 82 of the check valve 78.

Conduit 92 is attached to and in communication with the outlet port 90 of the drying column 86 for continuously delivering the scrubbed and dried gas sample from the dryer to a gas analyzing instrument such as a chromatographic analyzer, mass spectrometer, and the like.

In the operation of the apparatus of this invention, the sample is continuously introduced via line 2 into the lower portion 10 of the first scrubbing column's chamber 6. The sample flows upwardly in the body of scrubbing liquid 18 and in so doing contacts the gas-liquid contact means 20 immersed within the body of scrubbing liquid. In this manner, the gas is cooled and certain heavy oils present in the sample stream are entrained by the scrubbing liquid and other undesirable particles are washed from the sample.

The fluid sample and scrubbing liquid reaching the upper portion 8 of the first scrubbing column are discharged through the outlet port 16 and flow into the chamber 26 of the float trap 24. The gas sample, being lighter than the scrubbing liquid 18, separates from the liquid, flows upwardly through the chamber 26 of the float trap 24, into the upper portion 28 of the float trap, and discharges from the chamber through the sample discharge port 34. Since scrubbing liquid 18 is continuously entering the float trap 24 of the first scrubbing column 4, the float 38 of the float trap is caused to move upwardly in the chamber 26 from a first position to a higher second position. Upward movement of the float 38 in response to a rise of liquid level in the chamber 26, actuates the valve 36 and allows scrubbing liquid 18 in the chamber 26 to flow through the liquid discharge port 32. As the liquid level lowers in the chamber 26 in response to the discharge of scrubbing liquid 18 from the chamber, the float moves from its upward second position, wherein the valve 36 is open, toward the float's first position, wherein the valve is closed, thereby preventing the discharge of scrubbing liquid from the float trap. In this manner, the liquid level is maintained at a preselected height in the first scrubbing column 4.

Since scrubbing liquid 18 is continuously entering in the first scrubbing column through the fluid inlet port 14, it is preferred in this invention that the valve 36 of the float trap 24 operates with a throttling type action, thereby decreasing fluid surges in the float trap 24 and first scrubbing column 4. By so maintaining a substantially constant liquid level and gas accumulation zone volume in the first scrubbing column 4, the pressure exerted by the fluid in the column opposing the entrance of the sample stream into the first scrubbing column 4 is correspondingly maintained at a substantially constant predetermined value.

The sample flows from the float trap 24, through the sample inlet port 63, and into the lower end portion 56 of the second scrubbing column 44 Scrubbing liquid, such as water, continuously enters the water inlet port 60, flows downwardly through the chamber 46 of the second scrubbing column 44, and discharges through the fluid drain port 62 The sample stream flows through the chamber 46 of the second scrubbing column 44 in an upward direction opposed to the direction of flow of the water therein, and discharges through the sample outlet port 58 As the sample passes upwardly through the second scrubbing column 44 in contact with the water, the sample is further cooled and thoroughly scrubbed by the opposed flows of the two streams. Tars, oils, carbon particles, and the like, not scrubbed from the sample by the first scrubbing column 4, are therein removed.

Because the sample entering the second scrubbing column 44 is relatively free from undesirable particles, the water or scrubbing liquid discharging from the second scrubbing column is directed through the fluid inlet port 14 of the first scrubbing column 4 to supply scrubbing liquid 18 for the first scrubbing column, conserve scrubbing liquid, and avoid the need for additional equipment.

After flowing from the second scrubbing column 44, the sample flows into the inlet end 70 of the sample fluid path 66 of the heat exchanger 64 and through the sample fluid path where the sample is cooled to a temperature below 40° F., preferably to a temperature in the range of 34°—40° F., thereby condensing and removing liquid from the sample.

Cooling of the sample stream within the heat exchanger 64 is accomplished by conduction of sample stream heat through the walls which form the sample fluid path 66. It is preferable in this invention that the sample fluid path 66 be formed by conventional conduit or a plurality of conduits extending through the housing 94 of the heat exchanger 64. The annulus between the structure forming the sample fluid flow path 66 and the housing 94 forms the coolant fluid path 68. Fluid from the cooling source 72 enters the inlet end 74 of the coolant fluid path 68 of the heat exchanger 64, flows through the coolant fluid path in contact with the structure forming this sample fluid path 66, and discharges from the outlet end 76 of the coolant fluid path 68.

The temperature of the coolant discharging from the outlet end 76 of the coolant fluid path is below the temperature of the sample stream entering the heat exchanger. In order to increase the efficiency of the sampling apparatus of this invention, the coolant fluid path 68 is extended via line 3 beyond the heat exchanger and into contact with the second scrubbing column 44. In this manner, the sample stream is precooled in the second scrubbing column 44 prior to entering the heat exchanger 64. By precooling the sample stream in the second scrubbing column 44, entrained moisture condenses from the sample within the second scrubbing column, the power requirements of the cooling means are reduced, and the efficiency of the sampling system is increased.

Coolant from the outlet end 76 of the coolant fluid path 68 is discharged from the system or returned to the cooling source 72 for reconditioning, depending upon the type of cooling means employed in the system. It is preferred that a vortex cooling system, as for example that vortex cooling system described in U.S. Pat. No. 1,952,281, issued Mar. 24, 1934, be used in this invention, in which case the coolant fluid is exhausted from the system.

The sample thereafter flows from the heat exchanger, through the conventional liquid check valve 78, and into the drying column 86. In the event of apparatus malfunction, the liquid check valve 78 prevents liquid from flowing upwardly from the second scrubbing column, through the heat exchanger, and into the drying column.

The gas sample passes through the drying column 86 in contact with desiccant contained therein. Mist and entrained liquid droplets which have not been removed by condensation in the heat exchanger 64 or scrubbed from the sample in the scrubbing columns 4, 44, is absorbed by the desiccant.

The dry, conditioned gas sample is thereafter discharged from the outlet port 90 of the drying column 86 and flows through conduit 92 to the gas analysis equipment where it is continuously analyzed.

The following example further illustrates the objects and advantages of this invention, but it should be understood that the subject invention is not to be unduly limited to that set forth in this example for illustrative purposes.

EXAMPLE I

A gaseous sample stream is withdrawn from the effluent line of a thermal cracking furnace wherein an ethane stream is being cracked to produce ethylene. This sample stream enters scrubbing column 4 at a temperature in the range of 300° F. to 400° F. This sample stream comprises approximately 50 percent water vapor. The compositions of the hydrocarbons are set forth in Table I.

TABLE I

| Components: | Mol percent |
| --- | --- |
| Hydrogen | 38.4 |
| Methane | 6.1 |
| Ethylene | 27.4 |
| Ethane | 26.7 |
| Acetylene | 0.1 |
| Propylene | 0.8 |
| Propane | 0.4 |
| Butylenes | 0.1 |
| Butadienes | 0.2 |
| Normal butane | 0.2 |
| Carbon trace (coke) | Trace |

Various modifications and alterations of this invention will become apparent to those skilled in the art from the foregoing discussion, example, and accompanying drawings, and it should be understood that this invention is not to be unduly limited thereto.

What we claim is:

1. A sampling apparatus, comprising, in combination:
   a first vertical scrubbing column having a chamber, upper and lower portions, sample inlet and liquid inlet ports on the lower portions, a sample outlet port on the upper portion, a body of scrubbing liquid within the chamber, a plurality of glass particles immersed therein, and a gas accumulating zone thereabove;
   means connected to the sample inlet port for introducing a sample stream into the chamber;
   a float trap having a chamber with upper and lower portions connected to the outlet port of the first scrubbing column, a liquid discharge port on the lower portion, a sample discharge port on the upper portion, a float movably mounted within the chamber for movement between first and second positions, and a valve positioned within the liquid discharge port and attached to the float;
   a second vertical scrubbing column having a chamber, sidewalls, upper and lower ends, upper and lower portions, a sample inlet port on the lower portion connected to the sample discharge port of the float trap, a liquid drain port on the lower end, a sample outlet port on the upper end, and a water inlet port on the sidewall of the upper portion attached to the float trap with the trap sample discharge port connected in communication with said sample inlet port and to the first scrubbing column with the liquid inlet port of the first scrubbing column connected in communication with said second column liquid drain port;
   a water supply source attached to the water inlet port of the second scrubbing column for passing water into and downwardly through said column;
   a heat exchanger having means defining individual sample and coolant paths, each skilled in means having inlet and outlet ends, for the separate flow of coolant and sample therethrough, FIGURE heat exchanger being attached to the second scrubbing column with the sample outlet port of the second scrubbing column connected to and in communication with the inlet end of said sample path;

cooling means attached to and in communication with the inlet end of the coolant path means of the heat exchanger for passing coolant therethrough and cooling the sample passing through the heat exchanger to a temperature below about 40° F. as measured at the outlet end of the sample path means of the heat exchanger;

a liquid check valve having inlet and outlet ends attached at its inlet end to the outlet end of the sample path means of the heat exchanger;

a drying column having inlet and outlet ports and containing a desiccant attached at the inlet end to and in communication with the outlet end of the check valve; and means for delivering the sample from the outlet end of the drying column.

2. An apparatus, as set forth in claim 1, wherein a filter is positioned between the inlet and outlet ends of the sample fluid path means of the heat exchanger.

3. An apparatus, as set forth in claim 1, wherein the coolant fluid path means of the heat exchanger is extended through a line with said line being in contact with the second scrubbing column for cooling the sample stream in the second scrubbing column.

UNITED STATES PATENT OFFICE

CERTIFICATE OF CORRECTION

Patent No. 3,581,473    Otis E. Ririe, Jr., John M. Magee,    Dated June 1, 1971
Herbert A. Ems It is certified that error appears in the above-identified patent and that said Letters Patent are hereby corrected as shown below:

Column 4, line 73, "skilled in" should be -- path --.

Column 4, line 76, "FIGURE" should be -- said --.

Column 6, line 9 "fluid" should be deleted.

Signed and sealed this 28th day of September 1971.

(SEAL)
Attest:

EDWARD M. FLETCHER, JR.
Attesting Officer

ROBERT GOTTSCHALK
Acting Commissioner of Patents